Figures 17, 18:
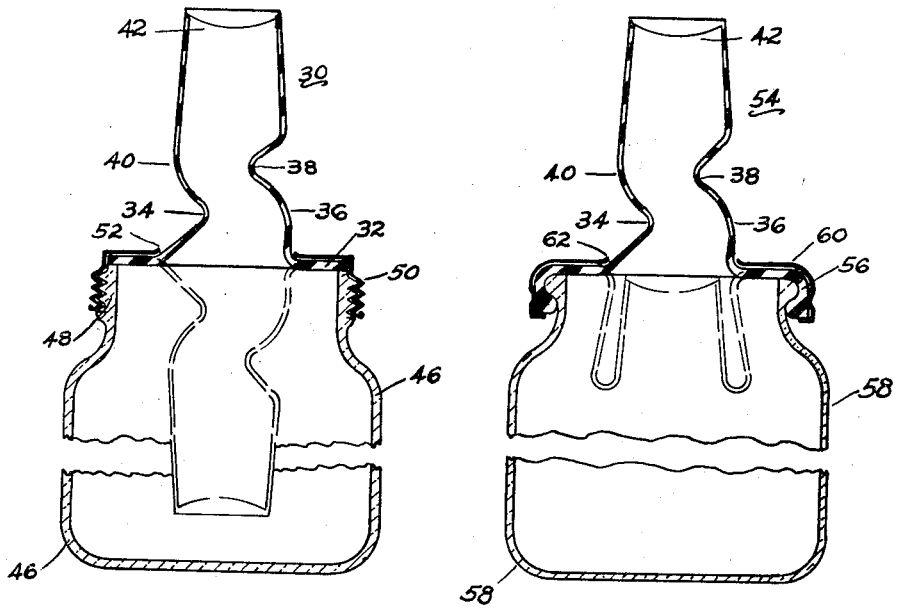

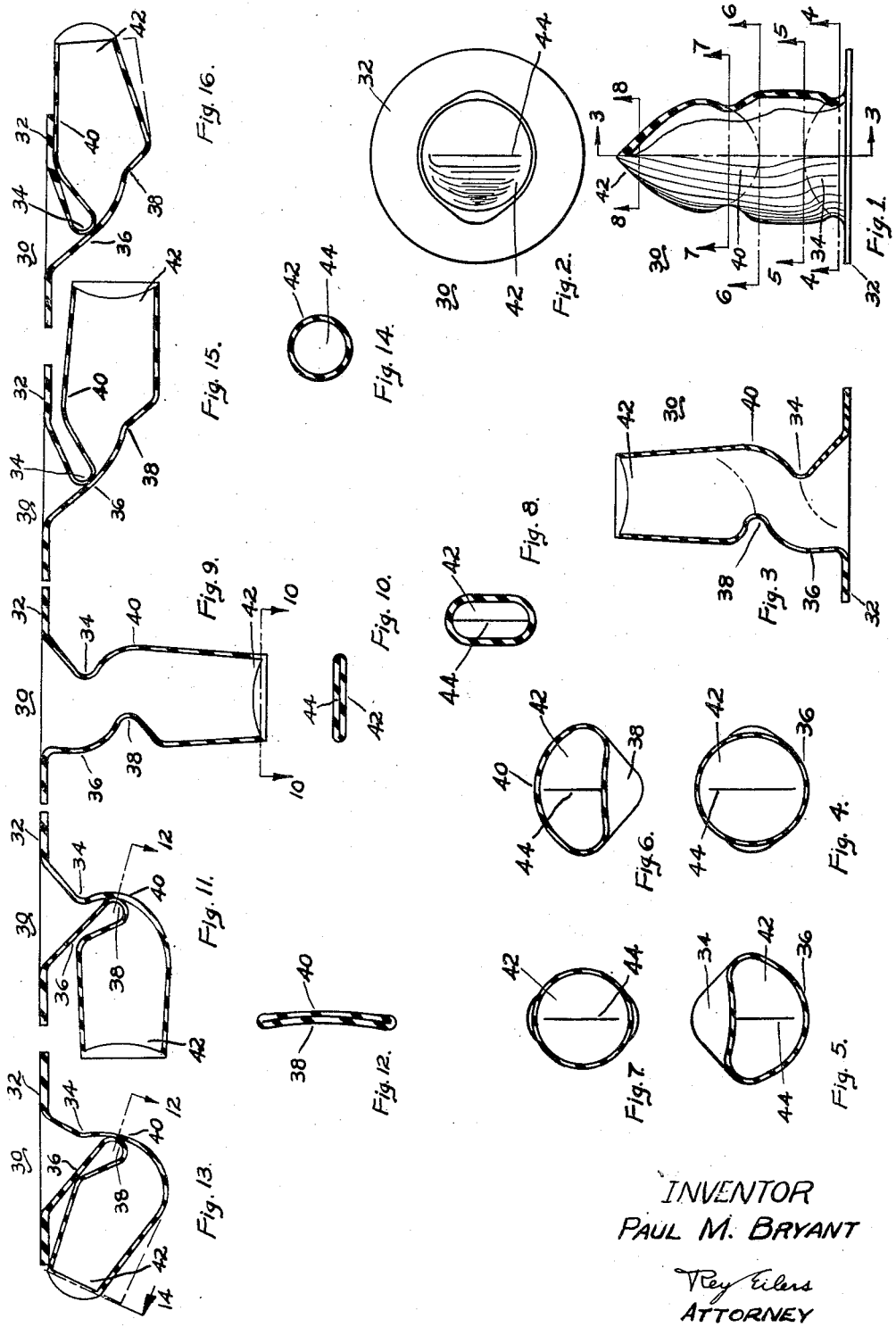

United States Patent Office
2,773,631
Patented Dec. 11, 1956

2,773,631

MEASURING AND DISPENSING DEVICES FOR CONTAINERS

Paul M. Bryant, Akron, Ohio

Application January 16, 1952, Serial No. 266,671

18 Claims. (Cl. 222—430)

This invention relates to improvements in dispensing devices. More particularly, this invention relates to improvements in dispensing devices which may be associated with a container to permit or prevent the flow of material from that container.

It is therefore an object of the present invention to provide an improved dispensing device that can be associated with a container to permit or prevent the flow of material from that container.

It is desirable to provide containers with dispensing devices that can selectively permit or prevent the flow of material from those containers. It is further desirable to have those dispensing devices capable of measuring that flow of material to provide discrete, measured quantities of the material. In recognition of these requirements, several dispensing devices have been proposed and used which were intended to measure the flow of material from containers. Some of those dispensing devices were equipped with partitions that had orifices through them; and those partitions were useful in measuring the amount of material to be dispensed. However, the presence of those partitions tended to restrict the rates at which the material could flow through the dispensing devices, and the orifices tended to become plugged. Other dispensing devices did not utilize partitions with orifices through them; but such dispensing devices could not provide discrete, measured quantities of material from the containers. For these various reasons prior dispensing devices, that were to be used with containers for material, are objectionable. The present invention obviates these objections by providing a dispensing device which can dispense discrete, measured quantities of material, and which does not need a partition with an orifice through it. As a result, the dispensing device provided by the present invention can assure a full flow of material from the container and can avoid all undesired stoppages of that flow. It is therefore an object of the present invention to provide a dispensing device which can dispense discrete, measured amounts of material, and which does not need a partition with an orifice through it.

The present invention is enabled to dispense discrete, measured quantities of material from a container by having reentrant wall portions which establish predetermined bending lines for the dispensing device. The reentrant wall portions will respond to bending of the dispensing device about those bending lines to cause those bending lines and the opposite walls of the dispensing device to approach each other and halt further flow of material from the container. Those reentrant portions will, however, cause those bending lines and those walls to move away from each other when the dispensing device is permitted to return to its normal unstressed condition; thus assuring a full flow of the material from the container into the dispensing device. It is therefore an object of the present invention to provide a dispensing device with reentrant portions which establish predetermined bending lines and which respond to bending of the dispensing device about those bending lines to cause those bending lines and the opposite walls of the dispensing device to move toward each other.

The dispensing device provided by the present invention has two bending lines which are spaced apart. When the dispensing device is bent around one of those bending lines, it entraps a predetermined amount of material. When the dispensing device is bent around the other of those bending lines it entraps an amount of material which is larger than the said predetermined amount. Thus the present invention provides a dispensing device that can measure and dispense two individually different amounts of material. This is desirable since it provides greater flexibility and utility for said dispensing device. It is therefore an object of the present invention to provide a dispensing device that has one bending line about which the dispensing device can be bent to entrap a predetermined amount of material, and that has a second bending line about which the dispensing device can be bent to entrap an individually different amount of material.

Prior dispensing devices have been made with varying wall thickness and with sharply changing configurations. Such dispensing devices are expensive to make; both from the point of view of the cost of the molds and from the point of view of the amount of material in them. The present invention provides a dispensing device of greatly reduced cost, both from the point of view of the cost of the molds and from the point of view of the material in it, by providing a dispensing device which has a substantially uniform wall thickness and which is free of sharply changing configurations. Consequently, the dispensing device provided by the present invention can be made simply and economically.

The dispensing device provided by the present invention is hollow; and it has inner peripheries which progressively increase from one end of the dispensing device to the other. This is extremely desirable because it enables that dispensing device to be formed by dipping a male mold into a plastic solution and then "peeling" the molded dispensing device from the mold. Such a method of manufacture minimizes the cost of the molds required, and it greatly simplifies the molding process. It is therefore an object of the present invention to provide a hollow dispensing device which has progressively larger inner peripheries from one end to the other.

Prior dispensing devices have frequently been sold in conjunction with containers on which they are to be used; but this has been found to increase the overall height of those containers to an undue degree. This increase in overall height unduly increases storage and packaging costs. The present invention makes it possible to sell dispensing devices in conjunction with containers and still not increase the overall height of those containers by providing a dispensing device which can be telescoped downwardly into the container during packaging and storing. Once the container has been delivered to the ultimate user, the dispensing device can be telescoped out of that container; immediately ready for use. It is therefore and object of the present invention to provide a dispensing device for containers which can be assembled with a container and then telescoped within that container during packaging and storing.

Other and further objects and advantages of the present invention should become apparent from an examination of the drawing and accompanying description.

In the drawing and accompanying description, several preferred embodiments of the present invention have been shown and described but it is to be understood that the drawing and accompanying description are for the purpose of illustration only and do not limit the invention and that the invention will be defined by the appended claims.

In the drawing, Fig. 1 is a partially sectioned, side-elevational view of one form of dispensing device which is made in accordance with the principles and teachings of the present invention, Fig. 2 is a plan view of the dispensing device shown in Fig. 1, Fig. 3 is a cross-sectional side view of the dispensing device shown in Figs. 1 and 2, and it is taken along the plane indicated by the line 3—3 in Fig. 1, Fig. 4 is a cross-sectional bottom view of the dispensing device of Figs. 1-3, and it is taken along the plane indicated by the line 4—4 of Fig. 1, Fig. 5 is a cross-sectional bottom view of the dispensing device of Figs. 1-3, and it is taken along the plane indicated by the line 5—5 of Fig. 1, Fig. 6 is a cross-sectional bottom view of the dispensing device shown in Figs. 1-3, and it is taken along the plane 6—6 of Fig. 1, Fig. 7 is a cross-sectional bottom view of the dispensing device of Figs. 1-3, and it is taken along the plane indicated by the line 7—7 of Fig. 1, Fig. 8 is a cross-sectional bottom view of the dispensing device of Figs. 1-3, and it is taken along the plane indicated by the line 8—8 of Fig. 1, Fig. 9 is a cross-sectional side view of the dispensing device of Figs. 1-3, and it shows that device in inverted but unstressed position, Fig. 10 is a cross-sectional plan view of the dispensing device of Figs. 1-3 and 9, and it is taken along the plane indicated by the line 10—10 of Fig. 9, Fig. 11 is a cross-sectional side view of the dispensing device of Figs. 1-3 and 9, and it shows that dispensing device bent adjacent one of its two reentrant portions, Fig. 12 is a cross-sectional view of the dispensing device of Figs. 1-3, 9 and 11, and it is taken along the plane indicated by the line 12 of Fig. 11, Fig. 13 is a cross-sectional side view of the dispensing device of Figs. 1-3, 9 and 11, and it shows that dispensing device bent around said one reentrant portion and with its dispensing aperture open, Fig. 14 is a cross-sectional end view of the dispensing device of Figs. 1-3, 9, 11 and 13, and it is taken along the plane indicated by the line 14 in Fig. 13, Fig. 15 is a cross-sectional side view of the dispensing device of Figs. 1-3, 9, 11 and 13, and it shows that dispensing device bent around the other of its reentrant portions, Fig. 16 is a cross-sectional side view of the dispensing device of Figs. 1-3, 9, 11, 13 and 15, and it shows that dispensing device bent around said other reentrant portion and with its dispensing aperture open, Fig. 17 is a cross-sectional, front elevational view of the dispensing device of Figs. 1-3, 9, 11, 13, 15 and 16 associated with a container, and it shows the inverted position of that dispensing device by dotted lines, Fig. 18 is a cross-sectional, front elevational view of a dispensing device which is substantially similar to the dispensing device of Figs. 1-3, 9, 11, 13, and 15-17, but which has a flange that enables it to be used with a "press on" cap for containers, and it shows the telescoped position of that dispensing device by dotted lines.

Figures 19, 20, 21:
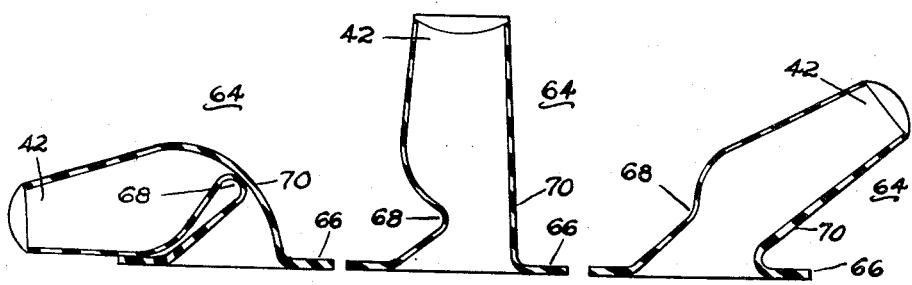

Fig. 19 is a cross-sectional side view of a modified form of dispensing device provided by the present invention, Fig. 20 is a cross-sectional side view of the dispensing device of Fig. 19, and it shows that dispensing device bent around its reentrant portion, and Fig. 21 is a cross-sectional side view of the dispensing device of Figs. 19 and 20, and it shows that dispensing device bent away from its reentrant portion.

Referring to the drawing in detail, the numeral 30 generally denotes a preferred form of dispensing device provided by the present invention. That dispensing device has an annular flange 32. The dispensing device 30 will preferably be made of a flexible material which is odorless and which is inert to the products which it is to dispense. A number of the vinyl plastics which are now commercially available will satisfy these requirements.

A reentrant portion 34 is disposed above the level of the flange 32, and this reentrant portion is disposed at one side of the dispensing device. The dispensing device is in the form of a hollow tube; and it has a generally cylindrical wall portion 36 in register with but normally spaced from the reentrant portion 34. The reentrant portion 34 establishes a bending line, shown in dotted line in Figs. 1 and 3, and that bending line and the cylindrical wall portion 36 normally define an area of predetermined size. A second reentrant wall portion 38 is provided on the opposite side of the dispensing device, at a point spaced above the reentrant portion 34 and the generally cylindrical portion 36. The reentrant portion 38 establishes a bending line which is shown in Figs. 1 and 3 by dotted lines. A generally cylindrical portion 40 is in register with but normally spaced from the reentrant portion 38. The bending line, established by the reentrant portion 38, and the generally cylindrical wall portion 40 normally define an area which has substantially the same size as the area defined by the reentrant portion 34 and the cylindrical wall portion 36.

The reentrant portions 34 and 38 and the generally cylindrical portions 36 and 40 of the dispensing device are connected together by smoothly merging wall portions; and those smoothly merging wall portions define areas which have substantially the same size as the area defined by the reentrant portion 34 and the cylindrical wall portion 36. The portion of the dispensing device 30 above the reentrant portion 38 and the generally cylindrical portion 40 will be bulbous and will taper to a closure 42. This closure has a slit 44 therein which constitutes a dispensing aperture for the dispensing device.

The areas defined by the reentrant portions 34 and 38 and by the generally cylindrical wall portions 36 and 40, and the areas defined by the smoothly merging wall portions, will all be substantially the same in size, but the peripheries of those areas will vary. In fact the peripheries of all horizontally-directed areas defined by the dispensing device 30 will be different; those peripheries being small adjacent the aperture 44 and becoming progressively larger as they approach the flange 32. This is very desirable because it facilitates "peeling" the dispensing device off of a male mold.

The configuration of the dispensing device 30 is complex, but it consists of relatively simple, smoothly merging surfaces. The reentrant portion 34 is, in part, conoidal in configuration. Specifically, the lower part of the reentrant portion 34 is conoidal in configuration. This is quite important since it enables the reentrant portion 34 to establish a determinable bending line even though the walls of the dispensing device 30 are thin and are of uniform thickness. The upper part of reentrant portion 34 is arcuate, but it is wider and flatter than the lower part of the reentrant portion 34. Conversely, the upper part of the reentrant portion 38 is, in part, conoidal in configuration. The lower part of the reentrant portion 38 is arcuate, but it is wider and flatter than the upper part of the reentrant portion 38. The conoidal configuration of the upper part of the reentrant portion 38 enables that reentrant portion to establish a determinable bending line spaced above the bending line established by the reentrant portion 34.

In its normal, unstressed condition, the dispensing device 30 has a succession of cross-sections of substantially equal area from the flange 32 up to a point above the reentrant portion 38. This succession of substantially equal cross-sections enables material to flow freely from a container into the dispensing device whenever the container and dispensing device are inverted. Any such flow of material will be full and immediate;

thus facilitating prompt filling of the dispensing device 30.

To dispense material from a container with which the dispensing device 30 is used, it is only necessary to invert that container and then bend the dispensing device about either of the bending lines defined by the reentrant portions 34 and 38. Figs. 11 and 13 disclose the bending of the dispensing device 30 about the bending line defined by the reentrant portion 38. It will be noted that as the dispensing device is bent around that bending line, the bending line and the generally cylindrical wall portion 40 both move toward each other. The conoidal part and the flatter part of the reentrant portion 38 both elongate as the material of the dispensing device "rolls" during the bending of the dispensing device; and this elongation forces the bending line toward the wall portion 40. Simultaneously, the wall portion 40 moves to meet the approaching bending line; and after the dispensing device has experienced a bending of approximately ninety degrees, the reentrant portion 38 and the wall portion 40 will meet. Such meeting is shown in Figs. 11 and 12. The reentrant portion 38 establishes an arcuate bending line, as shown particularly by Fig. 6; and that bending line continues to be arcuate, as shown by Fig. 12.

When the dispensing device 30 is caused to assume the position shown by Fig. 11, material will be trapped between the closure 42 and the bending line defined by the reentrant portion 38. To permit this material to flow out of the dispensing device, the closure 42 is bent even further about the bending line until one edge of that closure strikes the edge of flange 32 and is held against further movement, and the aperture 44 is forced to open. When fully opened, as by bending the other edge of closure 42 from the dotted to the solid line shown by Fig. 13, the aperture 44 has the circular configuration shown by Fig. 14. The opening of aperture 44 will combine with an appropriate tilting of the container to cause gravity-induced out-flow of material from the dispensing device 30.

It will be noted that during the bending of the dispensing device, the conoidal part of the reentrant portion 38 maintains its integrity and does not collapse. Instead that conoidal part causes a lengthening of itself and a lengthening of the flatter part of the reentrant portion 38. This is desirable since it obviates any need of varying the wall thicknesses of the dispensing device. When the force which causes the bending is released, the dispensing device will immediately return to its normal, unstressed condition. At such time, material can again flow from the container into the dispensing device.

The action of the dispensing device in bending about the bending line defined by the reentrant portion 34 is illustrated by Figs. 15 and 16. The reentrant portion 34 will experience an elongation of its conoidal part and its flatter part, as a comparison of Figs. 9 and 15 will show. This will cause the bending line to move toward the generally cylindrical wall portion 36. Simultaneously, the cylindrical wall portion 36 will move toward the bending line; and, as Fig. 15 shows, reentrant portion 34 will engage the generally cylindrical portion 36 and entrap material. The amount of material entrapped in this bending operation is larger than the amount of material entrapped when the dispensing device is bent about the bending line established by the reentrant portion 38. This amount of material can be discharged through the aperture 44 by providing further bending of the closure 42, as shown in Fig. 16.

During the bending of the dispensing device about the reentrant portion 34, the reentrant portion 38 tends to flatten out to some extent. However, the conoidal part of the reentrant portion 38 will tend to retain its conoidal configuration. When the force which caused the dispensing device 30 to bend about the bending line established by the reentrant portion 34 is released, the dispensing device 30 will return to its normal, unstressed condition.

As indicated in Fig. 17, the dispensing device 30 can be clamped to the top of a container 46 by a threaded retaining ring 50. This retaining ring will be secured to the container 46 by threads 48 on that container which mate with threads on the ring 50. The ring 50 has an opening 52 at the center thereof which receives the dispensing device 30.

When the dispensing device 30 is to be sold with the container 46, the dispensing device can be mounted as shown in Fig. 17 in solid lines, and the aperture 44 can be left uncut. The dispensing device 30 then will act as a seal which will assure the air-tightness of the container until the ultimate user cuts the aperture 44 with a suitable sharp instrument, such as a knife or a razor blade. If it is desired to cut the aperture 44 before selling the dispensing device, the dispensing device should be positioned within the container 46, as indicated by dotted lines in Fig. 17. When such a procedure is to be followed, a disc of suitably treated paper should be inserted between the flange 32 of the dispensing device and the top of the ring-like cap 50. Such a disc will assure the tightness of the container 46.

Fig. 18 discloses a dispensing device 54 which is identical with the dispensing device 30 except for the flange 56. This flange extends outwardly beyond the upper end of a container 58 and then extends down past the lip of that container. That flange thus constitutes a seal which can be held tightly in place by a "press-on" type of cap 60. Such a cap is customarily crimped onto the top of a container.

The cap 60 is provided with a circular opening 62 at the center thereof. This opening will accommodate the dispensing device 54 when it is in its normal unstressed position. The opening 62 will also permit the dispensing device 54 to be telescoped down into the top of the container 58. Where that dispensing device is telescoped down into the top of the container 58, as indicated by the dotted lines of Fig. 18, the overall height of the container will not be increased. The telescoping action should be possible in many instances because most containers have a small air space at the top thereof even after they have been filled. With such an air space, the movement of the dispensing device 54 into telescoped position merely shifts some of the material into that air space.

Where the aperture 44 of the dispensing device 54 is not cut until the container reaches the ultimate user, the dispensing device 54 constitutes a liquid-tight and air-tight seal for the container 58. That user can easily cut the aperture 44.

To dispense material from the container 58, the user need only grasp the closure 42 of the dispensing device 54 and pull that closure upwardly. Thereafter he can cut the aperture 44, invert the container, and bend the dispensing device 54 as desired. If it is desirable to cut the aperture 44 before the container is sold, a paper disc should be interposed between the cap 60 and the telescoped dispensing device 54.

Figs. 19–21 disclose a dispensing device which is generally denoted by the numeral 64. This dispensing device has a reentrant portion 68 that is, in part, conoidal in configuration. Specifically, the lower part of the reentrant portion 68 is conoidal in configuration. The upper part of that reentrant portion is flatter and wider than the conoidal part. The reentrant portion 68 defines a bending line which is spaced from a generally cylindrical wall portion 70. The generally cylindrical wall portion 70 is made thicker and stiffer than the reentrant portion 68 of the wall of the dispensing device. The flange 66 of the dispensing device 64 is comparable to the flange 32 of the dispensing device 30. The closure 42 of the dispensing device 64 is identical with the closure of the dispensing device 30 for all intents and purposes.

When the dispensing device 64 is bent about the bending line defined by the reentrant portion 68, the reentrant portion 68 will be elongated and will move the bending line toward the generally cylindrical wall portion 70. At the same time the generally cylindrical wall portion 70 will move toward the bending line; and the reentrant portion 68 will quickly engage the cylindrical wall portion 70 as shown in Fig. 20. At such time, a predetermined quantity of material will be trapped between that bending line and the closure 42. This material can be discharged by opening the aperture in the end of the closure 42.

When the dispensing device 64 is bent to the right, as indicated in Fig. 21, the stiff and thick wall portion 70 will not bend appreciably. Instead, it will move as a unit around the fillet between itself and the flange 66. As the wall portion 70 moves, it will cause the reentrant portion 68 to flatten out somewhat, although the conoidal part of that reentrant portion will retain its configuration. The pressure which causes the dispensing device to bend to the right, as shown in Fig. 21, will cause the aperture 44 to open; and material can be poured from the container through the dispensing device in a continuous stream.

The apertures 44 of the dispensing devices 30, 54 and 64 are normally closed. As a result, the dispensing devices 30, 54 and 64 seal in the flavor and aroma of food products in the containers with which they are associated.

Whereas the drawing and accompanying description have shown and described several preferred embodiments of the present invention, it should be apparent to those skilled in the art that various changes may be made in the form of the invention without affecting the scope thereof.

What I claim is:

1. A measuring and dispensing device for containers that can be associated with a container to selectively permit or prevent the flow of material from said container and that comprises an elongated, thin-walled tube of flexible material, said tube having a lower end securable to a container and an upper end spaced from said container, an opening at the lower end of said tube, a closure at the upper end of said tube, a normally closed aperture in said closure, said tube having a horizontally-directed cross-section in the wall thereof that is spaced from said upper end and is elongated in one direction, said tube having a second horizontally-directed cross-section in the wall thereof that is spaced from the first said cross-section and said upper end and that is elongated in a direction which is angularly spaced from the first said direction, said cross-sections normally bounding areas of substantially equal size, said second cross-section having one edge thereof defined by a reentrant portion of the wall of said tube, said reentrant portion of the wall of said tube constituting a bending line for said tube, said reentrant portion of the wall of said tube defining a convex surface at the interior of said tube which projects inwardly toward the longitudinal center of said tube and which can selectively approach the oppositely disposed portion of the wall of said tube to prevent flow of material past said second cross section, said tube being bendable about said bending line to reduce the area defined by said second cross-section to a value that will prevent flow of material from said container past said second cross-section, said reentrant portion of the wall of said tube automatically bowing inwardly and moving said bending line toward said oppositely disposed portion of the wall of the tube as said tube bends about said bending line, said aperture in said closure being openable by distortion of said closure, said reentrant portion of the wall of said tube being in part conoidal in configuration.

2. A measuring and dispensing device for containers that can be associated with a container to selectively permit or prevent the flow of material from said container and that comprises an elongated, thin-walled tube of flexible material, said tube having a lower end securable to a container and an upper end spaced from said container, an opening at the lower end of said tube, a normally closed aperture in the upper end of said tube, said tube having a horizontally-directed cross-section in the wall thereof that is elongated in one direction, said tube having a second horizontally-directed cross-section in the wall thereof that is spaced from the first said cross-section and that is elongated in a direction which is angularly spaced from the first said direction, said cross-sections normally bounding areas of substantially equal size, said second cross-section having one edge thereof defined by a reentrant portion of the wall of said tube, said reentrant portion of the wall of said tube constituting a bending line for said tube, said reentrant portion of the wall of said tube defining a convex surface at the interior of said tube, which projects inwardly toward the longitudinal center of said tube and which can selectively approach the oppositely disposed portion of the wall of said tube to prevent flow of material past said second cross section, said tube being bendable about said bending line to reduce the area defined by said second cross-section to a value that will prevent flow of material from said container past said second cross-section, said reentrant portion of the wall of said tube automatically bowing inwardly and moving said bending line toward said oppositely disposed portion of the wall of the tube as said tube bends about said bending line, said aperture being openable by distortion of said upper end of said tube.

3. A measuring and dispensing device for containers that can be associated with a container to selectively permit or prevent the flow of material from said container and that comprises an elongated tube of flexible material, said tube having a lower end securable to a container and an upper end spaced from said container, an opening at the lower end of said tube, a closure at the upper end of said tube, a normally closed aperture in said closure, said tube having a horizontally-directed cross-section in the wall thereof that is elongated in one direction, said tube having a second horizontally-directed cross-section in the wall thereof that is spaced from the first said cross-section and that is elongated in a direction which is angularly spaced from the first said direction, said cross-sections normally bounding areas of substantially equal size, said second cross-section having one edge thereof defined by a reentrant portion of the wall of said tube, said reentrant portion of the wall of said tube constituting a bending line for said tube, said reentrant portion of the wall of said tube defining a convex surface at the interior of said tube which projects inwardly toward the longitudinal center of said tube and which can selectively approach the oppositely disposed portion of the wall of said tube to prevent flow of material past said second cross section, said tube being bendable about said bending line to reduce the area defined by said second cross-section to a value that will prevent flow of material from said container past said second cross-section, said reentrant portion of the wall of said tube automatically bowing inwardly and moving said bending line toward said oppositely disposed portion of the wall of the tube as said tube bends about said bending line, said reentrant portion of the wall of said tube being in part conoidal in configuration.

4. A measuring and dispensing device for containers that can be associated with a container to selectively permit or prevent the flow of material from said container and that comprises an elongated tube of flexible material, said tube having a lower end securable to a container and an upper end spaced from said container, an opening at the lower end of said tube, a normally closed aperture, said tube having a horizontally-directed cross-section in the wall thereof that is elongated in one direction, said tube having a second horizontally-directed cross-section in the wall thereof that is spaced from the first said cross-section and that is elongated in a direction which is angularly spaced from the first said direction, said cross-sections normally bounding areas of substantially equal size, said second cross-section having one edge thereof defined by a reentrant portion of the wall of said tube, said reentrant portion of the wall of said tube constituting a bending line for said tube, said reentrant portion of the wall of said tube defining a convex surface at the interior of said tube which projects inwardly toward the longitudinal center of said tube and which can selectively approach the oppositely disposed portion of the wall of said tube to prevent flow of material past said second cross section; said tube being bendable about said bending line to reduce the area defined by said second cross-section to a value that will prevent flow of material from said container past said second cross-section, said reentrant portion of the wall of said tube automatically bowing inwardly and moving said bending line toward said oppositely disposed portion of the wall of the tube as said tube bends about said bending line to hold a predetermined volume of material between said bending line and said aperture, said volume of material being dispensable by opening said aperture.

5. A measuring and dispensing device for containers that can be associated with a container to selectively permit or prevent the flow of material from said container, and that comprises a tube of flexible material, an opening at one end of said tube, a closure at the other end of said tube, a normally closed aperture in said tube, a bending line intermediate the ends of said tube, a second bending line intermediate the ends of said tube, said bending lines being spaced apart longitudinally of said tube, said tube being bendable about the first said bending line to entrap a predetermined quantity of material between said closure and the first said bending line, said tube being bendable about said second bending line to entrap a larger predetermined quantity of material between said closure and said second bending line, said aperture being openable to release said entrapped material, the first said bending line being defined by a reentrant portion of the wall of said tube, said reentrant portion of the wall of said tube defining a convex surface at the interior of said tube which projects inwardly toward the longitudinal center of said tube and which automatically approaches the oppositely disposed portion of the wall of said tube to prevent flow of material past the first said bending line whenever said tube is bent at the first said bending line, said second bending line being defined by a second reentrant portion of the wall of said tube, said second reentrant portion of the wall of said tube defining a convex surface at the interior of said tube which projects inwardly toward the longitudinal center of said tube and which automatically approaches the oppositely disposed portion of the wall of said tube to prevent flow of material past said second bending line whenever said tube is bent at said second bending line, each of said reentrant portions of the wall of said tube being in part conoidal in configuration.

6. A measuring and dispensing device for containers that can be associated with a container to selectively permit or prevent the flow of material from said container and that comprises a tube of flexible material, an opening at one end of said tube, a closure at the other end of said tube, a normally closed aperture in said tube, a bending line intermediate the ends of said tube, a second bending line intermediate the ends of said tube, said bending lines being spaced apart longitudinally of said tube, said tube being bendable about the first said bending line to entrap a predetermined quantity of material between said closure and the first said bending line, said tube being bendable about said second bending line to entrap a larger predetermined quantity of material between said closure and said second bending line, said aperture being openable to release said entrapped material, the first said bending line being defined by a reentrant portion of the wall of said tube, said reentrant portion of the wall of said tube defining a convex surface at the interior of said tube which projects inwardly toward the longitudinal center of said tube and which automatically approaches the oppositely disposed portion of the wall of said tube to prevent flow of material past the first said bending line whenever said tube is bent at the first said bending line, said second bending line being defined by a second reentrant portion of the wall of said tube, said second reentrant portion of the wall of said tube defining a convex surface at the interior of said tube which projects inwardly toward the longitudinal center of said tube and which automatically approaches the oppositely disposed portion of the wall of said tube to prevent flow of material past said second bending line whenever said tube is bent at said second bending line, said reentrant portions of the wall of said tube being disposed on opposite sides of said tube.

7. A measuring and dispensing device for containers that can be associated with a container to selectively permit or prevent the flow of material from said container and that comprises a tube of flexible material, an opening at one end of said tube, a closure at the other end of said tube, a normally closed aperture in said tube, a bending line intermediate the ends of said tube, a second bending line intermediate the ends of said tube, said bending lines being spaced apart longitudinally of said tube, said tube being bendable about the first said bending line to entrap a predetermined quantity of material between said closure and the first said bending line, said tube being bendable about said second bending line to entrap a larger predetermined quantity of material between said closure and said second bending line, said aperture being openable to release said entrapped material, the first said bending line being defined by a reentrant portion of the wall of said tube, said reentrant portion of the wall of said tube defining a convex surface at the interior of said tube which projects inwardly toward the longitudinal center of said tube and which automatically approaches the oppositely disposed portion of the wall of said tube to prevent flow of material past the first said bending line whenever said tube is bent at the first said bending line, said second bending line being defined by a second reentrant portion of the wall of said tube, said second reentrant portion of the wall of said tube defining a convex surface at the interior of said tube which projects inwardly toward the longitudinal center of said tube and which automatically approaches the oppositely disposed portion of the wall of said tube to prevent flow of material past said second bending line whenever said tube is bent at said second bending line, the first said reentrant portion of the wall of said tube being in register with but spaced from another portion of the wall of said tube to normally define an area of predetermined size, said second reentrant portion of the wall of said tube being in register with but spaced from still another portion of the wall of said tube to normally define a second area of substantially the same said size, said reentrant portions and said other portions of the wall of said tube being connected together by wall portions which define areas of substantially the same said size.

8. A measuring and dispensing device for containers that can be associated with a container to selectively permit or prevent the flow of material from said container and that comprises a tube of flexible material, an opening at one end of said tube, a closure at the other end of said tube, a normally closed aperture in said tube, a bending line intermediate the ends of said tube, a second bending line intermediate the ends of said tube, said bending lines being spaced apart longitudinally of said tube, said tube being bendable about the first said bending line to entrap a predetermined quantity of material between said closure and the first said bending line, said tube being bendable about said second bending line to entrap a larger predetermined quantity of material between said closure and said second bending line, said aperture being openable to release said entrapped material, the first said bending line being defined by a reentrant portion of the wall of said tube, said reentrant portion of the wall of said tube defining a convex surface at the interior of said tube which projects inwardly toward the longitudinal center of said tube and which automatically approaches the oppositely disposed portion of the wall of said tube to prevent flow of material past the first said bending line whenever said tube is bent at the first said bending line, said second bending line being defined by a second reentrant portion of the wall of said tube, said second reentrant portion of the wall of said tube defining a convex surface at the interior of said tube which projects inwardly toward the longitudinal center of said tube and which automatically approaches the oppositely disposed portion of the wall of said tube to prevent flow of material past said second bending line whenever said tube is bent at said second bending line.

9. A measuring and dispensing device for containers that can be associated with a container to selectively permit or prevent the flow of material from said container and that comprises a tube of flexible material, an opening at one end of said tube, a closure at the other end of said tube, a normally closed aperture in said tube, an indented bending line intermediate the ends of said tube that forms a convex surface at the interior of said tube and which automatically approaches the oppositely disposed portion of the wall of said tube to prevent flow of material past the first said bending line whenever said tube is bent at the first said bending line, a second indented bending line intermediate the ends of said tube that forms a convex surface at the interior of said tube and which automatically approaches the oppositely disposed portion of the wall of said tube to prevent flow of material past said second bending line whenever said tube is bent at said second bending line, said bending lines being spaced apart longitudinally of said tube, said tube being bendable about the first said bending line to entrap a predetermined quantity of material between said closure and the first said bending line, said tube being bendable about said second bending line to entrap a larger predetermined quantity of material between said closure and said second bending line, said aperture being openable to release said entrapped material, said bending lines being disposed at opposite sides of said tube whereby the bending of said tube about said bending lines is alternate.

10. A measuring and dispensing device for containers that can be associated with a container to selectively permit or prevent the flow of material from said container and that comprises a tube of flexible material, an opening at one end of said tube, a closure at the other end of said tube, a normally closed aperture in said tube, an indented bending line intermediate the ends of said tube that forms a convex surface at the interior of said tube and which automatically approaches the oppositely disposed portion of the wall of said tube to prevent flow of material past the first said bending line whenever said tube is bent at the first said bending line, a second indented bending line intermediate the ends of said tube that forms a convex surface at the interior of said tube and which automatically approaches the oppositely disposed portion of the wall of said tube to prevent flow of material past said second bending line whenever said tube is bent at said second bending line, said bending lines being spaced apart longitudinally of said tube, said tube being bendable about the first said bending line to entrap a predetermined quantity of material between said closure and the first said bending line, said tube being bendable about said second bending line to entrap a larger predetermined quantity of material between said closure and said second bending line, said aperture being openable to release said entrapped material, said bending lines being substantially parallel.

11. A measuring and dispensing device for containers that can be associated with a container to selectively permit or prevent the flow of material from said container and that comprises a tube of flexible material, an opening at one end of said tube, a closure at the other end of said tube, a normally closed aperture in said tube, an indented bending line intermediate the ends of said tube that forms a convex surface at the interior of said tube and which automatically approaches the oppositely disposed portion of the wall of said tube to prevent flow of material past the first said bending line whenever said tube is bent at the first said bending line, a second indented bending line intermediate the ends of said tube that forms a convex surface at the interior of said tube and which automatically approaches the oppositely disposed portion of the wall of said tube to prevent flow of material past said second bending line whenever said tube is bent at said second bending line, said bending lines being spaced apart longitudinally of said tube, said tube being bendable about the first said bending line to entrap a predetermined quantity of material between said closure and the first said bending line, said tube being bendable about said second bending line to entrap a larger predetermined quantity of material between said closure and said second bending line, said aperture being openable to release said entrapped material.

12. A measuring and dispensing device for containers that can be associated with a container to selectively permit or prevent the flow of material from said container and that comprises a tube of flexible material, an opening at one end of said tube, a closure at the other end of said tube, a normally closed aperture in said tube, said tube having a reentrant wall portion to define a bending line for said tube intermediate the ends of said tube, said reentrant portion forming a bulging surface at the interior of said tube, said tube having another wall portion in register with but normally spaced from said reentrant wall portion, said reentrant wall portion being in part conoidal in configuration, said tube being bendable about said bending line to automatically elongate said bulging surface and to automatically move said bulging surface toward said other wall portion and thereby reduce the space between said reentrant wall portion and said other wall portion to prevent the flow of material past said bending line.

13. A measuring and dispensing device for containers that can be associated with a container to selectively permit or prevent the flow of material from said container and that comprises a tube of flexible material, an opening at one end of said tube, a closure at the other end of said tube, a normally closed aperture in said tube, said aperture being a slit in said closure, said tube having a reentrant wall portion to define a bending line for said tube intermediate the ends of said tube, said reentrant portion forming a bulging surface at the interior of said tube, said tube having another wall portion in register with but normally spaced from said reentrant wall portion, said tube being bendable about said bending line to automatically elongate said bulging surface and to automatically move said bulging surface toward said other wall portion and thereby reduce the space between said reentrant wall portion and said other wall portion to prevent the flow of material past said bending line, said aperture and said bending line being transverse of the axis of said tube and being transverse of each other.

14. A measuring and dispensing device for containers that can be associated with a container to selectively permit or prevent the flow of material from said container and that comprises a tube of flexible material, an opening at one end of said tube, a closure at the other end of said tube, a normally closed aperture in said tube, said tube having a reentrant wall portion to define a bending line for said tube, said tube having a generally cylindrical wall portion in register with but normally spaced from said reentrant wall portion, said tube being bendable about said bending line to automatically move said reentrant wall portions and said generally cylindrical wall portion toward each other to prevent flow of material from said container past said reentrant wall portion, said aperture being openable by forces applied to said tube at right angles to said bending line, said generally cylindrical wall portion being thicker and stiffer than said reentrant wall portion, said tube being bendable away from said bending line to move said reentrant portion and said generally cylindrical wall portion away from each other to permit flow of material past said reentrant portion, said aperture being openable whenever said tube is bent about or is bent away from said bending line whereby a limited or an unlimited flow of material from said container can be provided.

15. A measuring and dispensing device for containers that can be associated with a container to selectively permit or prevent the flow of material from said container and that comprises a tube of flexible material, an opening at one end of said tube, a closure at the other end of said tube, a normally closed aperture in said tube, said tube having a reentrant wall portion to define a bending line for said tube, said tube having a generally cylindrical wall portion in register with but normally spaced from said reentrant wall portion, said tube being bendable about said bending line to automatically move said reentrant wall portion and said generally cylindrical wall portion toward each other to prevent flow of material from said container past said reentrant wall portion, said generally cylindrical wall portion being thicker and stiffer than said reentrant wall portion, said tube being bendable away from said bending line to move said reentrant wall portion and said generally cylindrical wall portion away from each other to permit flow of material from said container past said reentrant wall portion.

16. A measuring and dispensing device for containers that can be associated with a container to selectively permit or prevent the flow of material from said container and that comprises a tube of flexible material, an opening at one end of said tube, a closure at the other end of said tube, a normally closed aperture in said tube, said tube having a reentrant wall portion to define a bending line for said tube intermediate the ends of said tube, said reentrant portion forming a bulging surface at the interior of said tube, said tube having a generally cylindrical wall portion in register with but normally spaced from said bulging surface formed by said reentrant wall portion, said tube being bendable about said bending line to automatically move said bulging surface formed by said reentrant wall portion and said generally cylindrical wall portion toward each other to prevent flow of material from said container past said reentrant wall portion.

17. A measuring and dispensing device for containers that can be associated with a container to selectively permit or prevent the flow of material from said container and that comprises a tube of flexible material, an opening at one end of said tube, a closure at the other end of said tube, a normally closed aperture in said tube, said tube having a reentrant wall portion do define a bending line for said tube intermediate the ends of said tube, said reentrant portion forming a bulging surface at the interior of said tube, said tube having a generally cylindrical wall portion in register with but normally spaced from said bulging surface formed by said reentrant wall portion, said tube being bendable about said bending line to automatically reduce the space between said bulging surface formed by said reentrant wall portion and said generally cylindrical wall portion, said bulging surface formed by said reentrant wall portion automatically bowing inwardly and moving said bending line toward said generally cylindrical wall portion as said tube bends about said bending line.

18. A measuring and dispensing device for containers that can be associated with a container to selectively permit or prevent the flow of material from said container and that comprises a tube of flexible material, an opening at one end of said tube, a closure at the other end of said tube, a normally closed aperture in said tube, said tube having a wall of substantially uniform thickness, said tube having a reentrant wall portion to define a bending line for said tube intermediate the ends of said tube, said reentrant portion forming a bulging surface at the interior of said tube, said tube having another wall portion in register with but normally spaced from said bulging surface formed by said reentrant wall portion, said tube being bendable about said bending line to automatically reduce said space between said bulging surface formed by said reentrant wall portion and the other said wall portion to prevent the flow of material past said bending line.

References Cited in the file of this patent

UNITED STATES PATENTS

| | | |
|---|---|---|
| 66,212 | Burnet | July 2, 1867 |
| 570,759 | Law | Nov. 3, 1896 |
| 2,113,022 | Hefti | Apr. 5, 1938 |
| 2,543,470 | Ryan | Feb. 27, 1951 |
| 2,554,050 | Neubeck | May 22, 1951 |
| 2,561,596 | Rieke | July 24, 1951 |
| 2,574,931 | Nason | Nov. 13, 1951 |
| 2,661,128 | Rieke | Dec. 1, 1953 |